United States Patent
Patel

(10) Patent No.: US 9,336,782 B1
(45) Date of Patent: May 10, 2016

(54) DISTRIBUTED COLLECTION AND PROCESSING OF VOICE BANK DATA

(71) Applicant: VocaliD, Inc., Belmont, MA (US)

(72) Inventor: Rupal Patel, Belmont, MA (US)

(73) Assignee: VOCALID, INC., Belmont, MA (US)

( * ) Notice: Subject to any disclaimer, the term of this patent is extended or adjusted under 35 U.S.C. 154(b) by 0 days.

(21) Appl. No.: 14/753,233

(22) Filed: Jun. 29, 2015

(51) Int. Cl.
G10L 13/00 (2006.01)
G10L 17/22 (2013.01)
G10L 13/033 (2013.01)
G10L 13/06 (2013.01)
G10L 13/04 (2013.01)

(52) U.S. Cl.
CPC .............. *G10L 17/22* (2013.01); *G10L 13/00* (2013.01); *G10L 13/033* (2013.01); *G10L 13/04* (2013.01); *G10L 13/06* (2013.01)

(58) Field of Classification Search
CPC ............................... G10L 13/033; G10L 13/04
See application file for complete search history.

(56) References Cited

U.S. PATENT DOCUMENTS

| | | | | |
|---|---|---|---|---|
| 5,970,453 | A * | 10/1999 | Sharman | G10L 13/07 704/258 |
| 6,112,176 | A * | 8/2000 | Goldenthal | G10L 15/06 704/231 |
| 7,277,855 | B1 * | 10/2007 | Acker | G10L 13/02 704/260 |
| 7,328,157 | B1 * | 2/2008 | Chu | G10L 13/08 704/258 |
| 7,630,898 | B1 * | 12/2009 | Davis | G06F 17/2735 704/260 |
| 8,086,457 | B2 | 12/2011 | Campbell | |
| 8,311,830 | B2 | 11/2012 | Campbell | |
| 8,655,664 | B2 * | 2/2014 | Tachibana | G10L 13/08 704/10 |
| 8,700,396 | B1 * | 4/2014 | Mengibar | G10L 15/063 704/235 |
| 2002/0072900 | A1 * | 6/2002 | Keough | G10L 13/033 704/220 |
| 2002/0143542 | A1 * | 10/2002 | Eide | G10L 13/02 704/260 |
| 2004/0111271 | A1 * | 6/2004 | Tischer | G10L 13/033 704/277 |
| 2005/0108013 | A1 * | 5/2005 | Karns | G10L 15/005 704/254 |

(Continued)

OTHER PUBLICATIONS

Schötz, Susanne. Perception, analysis and synthesis of speaker age. vol. 47. Lund University, 2006.*
Schötz, Susanne. "Speaker Age: A First Step From Analysis to Synthesis." the 15th International Congress of Phonetic Sciences. Casual Productions, 2003.*

(Continued)

*Primary Examiner* — Brian Albertalli
(74) *Attorney, Agent, or Firm* — O'Neill Patent Law

(57) ABSTRACT

Voice data may be collected by a plurality of voice donors and stored in a voice bank. A voice donor may authenticate to a voice collection system to start a session to provide voice data. During the voice collection session, the voice donor may be presented with a sequence of prompts to speak and voice data may be transferred to a server. The received voice data may be processed to determine the speech units spoken by the voice donor and a count of speech units received from the voice donor may be updated. Feedback may be provided to the voice donor indicating, for example, a progress of the voice collection, a quality level of the voice data, or information about speech unit counts. The voice bank may be used to create TTS voices for voice recipients, create a model of voice aging, or for other applications.

28 Claims, 6 Drawing Sheets

(56) References Cited

U.S. PATENT DOCUMENTS

| | | | | |
|---|---|---|---|---|
| 2005/0256716 | A1* | 11/2005 | Bangalore | G10L 13/02 704/260 |
| 2007/0016422 | A1* | 1/2007 | Mori | G10L 13/08 704/260 |
| 2008/0082316 | A1* | 4/2008 | Tsui | G09B 5/00 704/4 |
| 2011/0144997 | A1* | 6/2011 | Mizuguchi | G10L 13/06 704/258 |
| 2012/0046949 | A1* | 2/2012 | Leddy | G10L 13/033 704/260 |
| 2013/0218568 | A1* | 8/2013 | Tamura | G10L 13/033 704/260 |
| 2013/0289998 | A1* | 10/2013 | Eller | G10L 13/08 704/260 |

OTHER PUBLICATIONS

Reubold, Ulrich, Jonathan Harrington, and Felicitas Kleber. "Vocal aging effects on F 0 and the first formant: a longitudinal analysis in adult speakers." Speech Communication 52.7 (2010): 638-651.*

Zainko, Csaba, et al. "Some aspects of synthetic elderly voices in ambient assisted living systems." Speech Technology and Human-Computer Dialogue (SpeD), 2013 7th Conference on. IEEE, 2013.*

Veaux, Christophe, Junichi Yamagishi, and Simon King. "Towards personalized synthesized voices for individuals with vocal disabilities: voice banking and reconstruction." SLPAT 2013 (2013): 107.*

Bunnell, H. Timothy, and Rupal Patel. "VocaliD: Personal voices for augmented communicators." The Journal of the Acoustical Society of America 135.4 (2014): 2390-2390.*

Yarrington, Debra, et al. "A system for creating personalized synthetic voices." Proceedings of the 7th international ACM SIGACCESS conference on Computers and accessibility. ACM, 2005.*

Yarrington, Debra, et al. "ModelTalker voice recorder: An interface system for recording a corpus of speech for synthesis." Proceedings of the 46th Annual Meeting of the Association for Computational Linguistics on Human Language Technologies: Demo Session. Association for Computational Linguistics, 2008.*

Bunnell, H. Timothy, et al. "Automatic personal synthetic voice construction." Interspeech. 2005.*

Kuwabara, H., et al. "Construction of a large-scale Japanese speech database and its management system." Acoustics, Speech, and Signal Processing, 1989. ICASSP-89., 1989 International Conference on. IEEE, 1989.*

Yamagishi, Junichi, et al. "Speech synthesis technologies for individuals with vocal disabilities: Voice banking and reconstruction." Acoustical Science and Technology 33.1 (2012): 1-5.*

Acapela Group provides online software for receiving audio for making TTS voices. More information at http://www.acapela-group.com/voices/voice-replacement/.

Model Talker provides online software for receiving audio for making TTS voices. More information at https://www.modeltalker.org/build-your-voice/.

* cited by examiner

DISTRIBUTED COLLECTION AND PROCESSING OF VOICE BANK DATA

BACKGROUND

Collection of high quality voice data from many different individuals may be desirable for a variety of applications. In one example, it may be desired to create text-to-speech (TTS) voices for a person, such as a person who has only limited speaking ability or has lost the ability to speak. For such people, it may be desirable to have a voice that sounds like him or her and/or matches his or her qualities, such as gender, age, and regional accents. By collecting voice data from a large number of individuals, it may be easier to create TTS voices that sound like the person.

The people from whom voice data is collected may be referred to as voice donors and a person who is receiving a TTS voice may be referred to as a voice recipient. A collection of voice data from many different voice donors may be referred to as a voice bank. When collecting voice data for a voice bank, it may be desirable to collect voice data from a wide variety of voice donors (e.g., age, gender, and location), to collect a sufficient amount of data to adequately represent all the sounds in speech (e.g., phonemes), and to ensure the collection of high quality data.

BRIEF DESCRIPTION OF THE FIGURES

The invention and the following detailed description of certain embodiments thereof may be understood by reference to the following figures.

DETAILED DESCRIPTION

Figure 1:
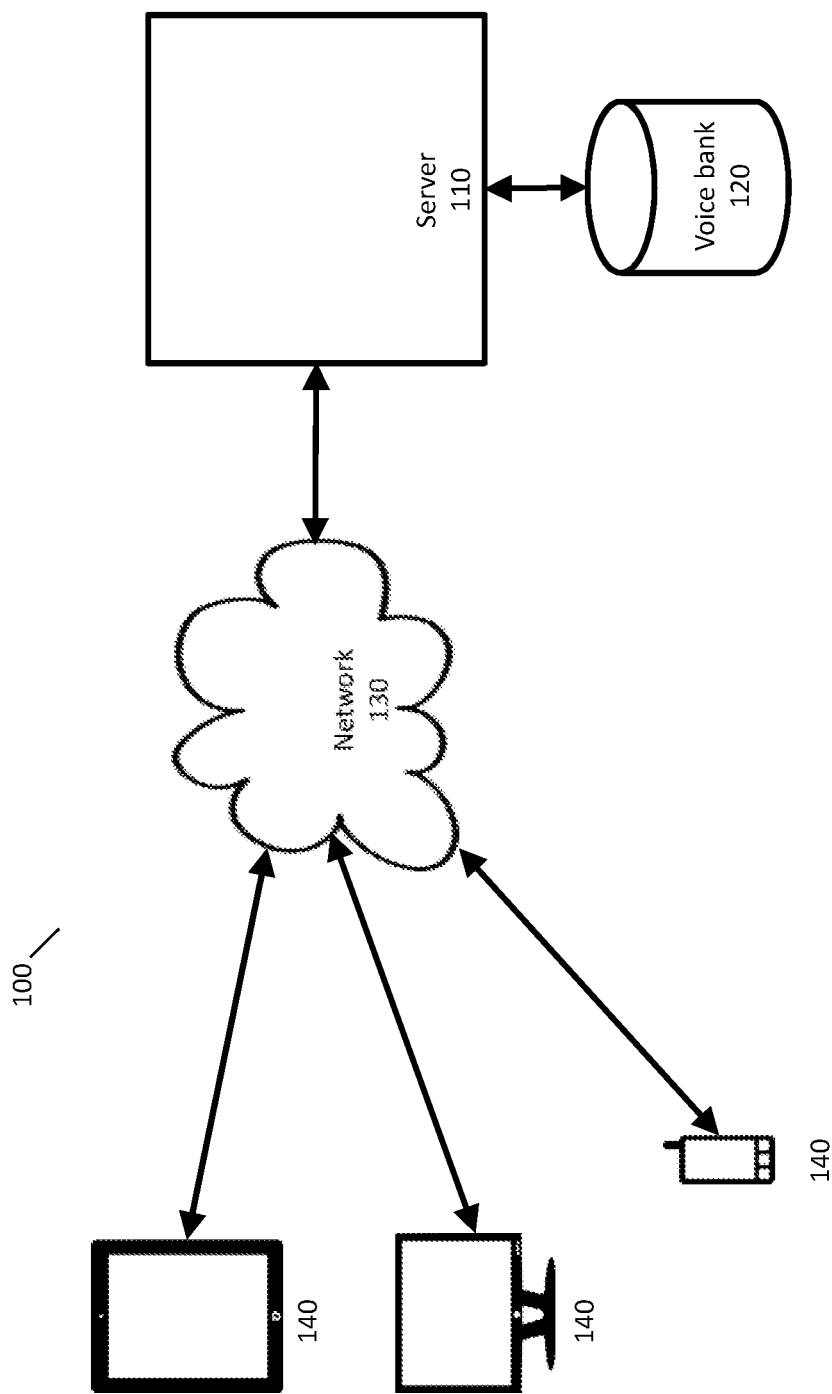
FIG. 1 illustrates one example of a system for collecting voice data from voice donors.

Described herein are techniques for collecting voice data from voice donors and storing the voice data in a voice bank. FIG. 1 illustrates one example of a voice collection system 100 for collecting voice data for a voice bank. The voice collection system 100 may have multiple voice donors 140. Each voice donor 140 may access the system using personal devices (e.g., personal computer, tablet, smartphone, or wearable device). The voice donors 140 may, for example, connect to a web page or may use an application installed on their device. The voice donors 140 may not have any experience in providing voice recordings and may not have any assistance from people who are experienced in voice collection techniques. The voice donors may further be providing voice donations in a variety of environments, such as in their home with background noise (e.g., television), while driving, or walking down the street. Because of the lack of experience of voice donors 140 and potentially noisy environments, additional measures may be taken to help ensure the collection of high quality data.

To facilitate the collection of voice data from a large number of voice donors 140, the voice data collection may be done over network 130, which may be any suitable network, such as the Internet or a mobile device data network. For example, voice donors may connect to a local area network (such as their home Wi-Fi), which then connects them to the Internet.

Network 130 allows voice donors 140 to connect to server 110. Server 110 may be a single server computer or may be a collection of server computers operating cooperatively with each other. Server 110 may provide functionality for assisting with the collection of voice data and storing the voice data in voice bank 120. Voice bank 120 may be contained within server 120 or may be a separate resource that is accessible by server 110. Voice donors 140 may be distributed from each other and/or remote from server 110.

It may be desirable to collect sufficient voice data from a wide variety of voice donors. For example, it may be desirable to collect 4-6 hours of speech from each voice donor over several sessions and to collect speech from more than 10,000 unique donors who span a wide variety of speaking styles around the world (e.g., different languages, accents, ages, etc.). It may also be desirable for a given donor to donate voice samples on a longitudinal basis.

To create a high quality TTS voice from data in the voice bank, it may be preferable to have sufficient examples of each relevant speech unit for each voice donor 140. A speech unit may be any sound or portion thereof in a language and examples of speech units include phonemes, phonemes in context, phoneme neighborhoods, allophones, syllables, diphones, and triphones. The techniques described herein may be used with any type of speech unit, but for clarity of presentation, phonemes will be used as an example speech unit. Implementations are not limited to phonemes, however, and any type of speech unit may be used instead. For an example with phonemes, the English language has approximately 45 phonemes, and it may be preferable to have at least 10-100 examples (depending on the speech unit, phoneme, or phoneme neighborhood) of a voice donor saying each phoneme so that a high quality TTS voice may be created corresponding to that voice donor. As used herein, a phoneme neighborhood may refer to an instance of a phoneme with respect to neighboring phonemes (e.g., one or more phonemes before or after the phoneme). For example, the word "cat" contains three phonemes, and the phoneme neighborhood for the "a" could be the phoneme "a" preceded by the phoneme "k" and followed by the phoneme "t".

Figure 2:
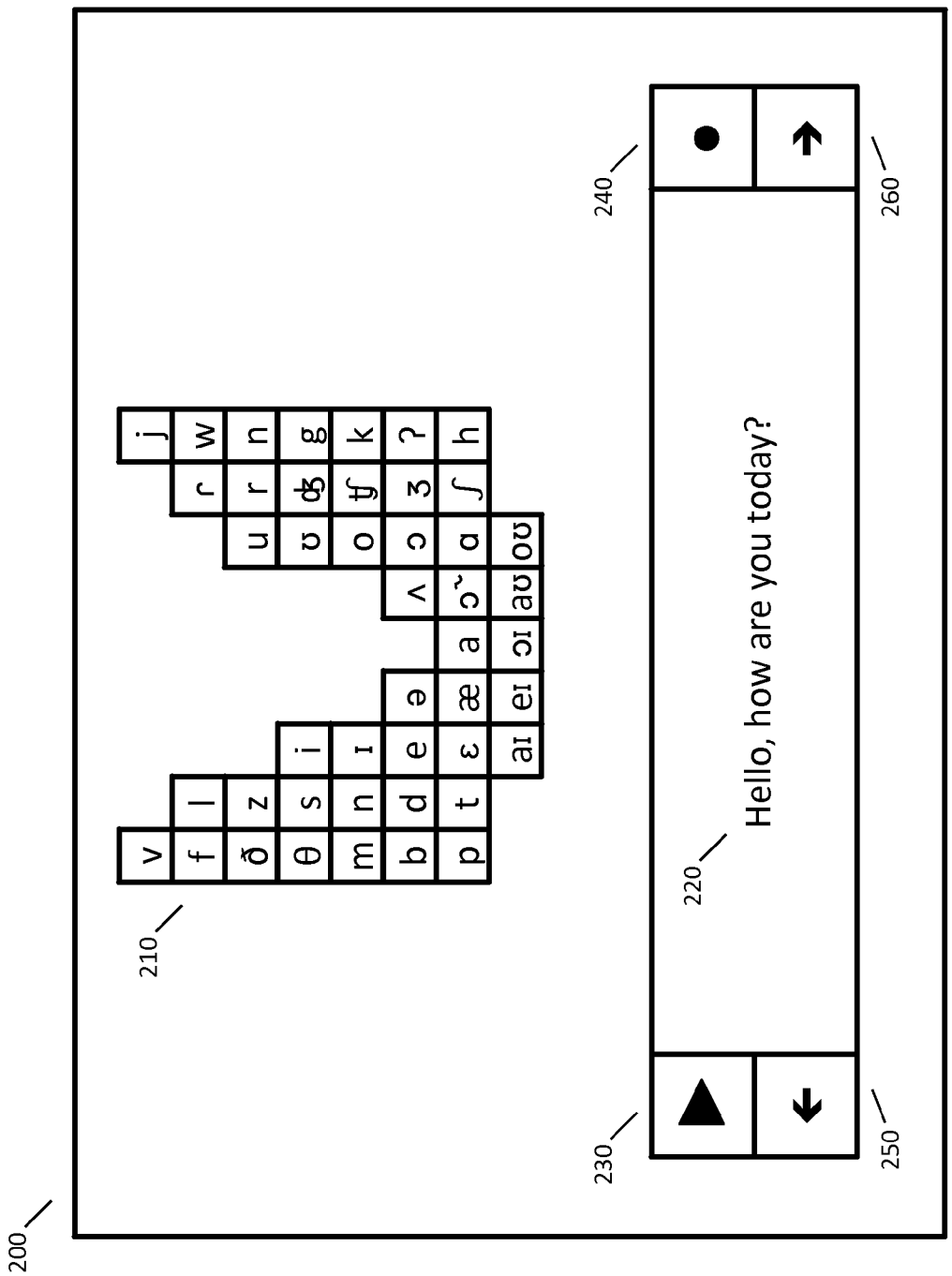
FIG. 2 illustrates components of a user interface for collecting voice data from voice donors.

FIG. 2 shows an example of a user interface 200 that may be presented to a voice donor 140 during the process of collecting speech from the voice donor. User interface 200 is exemplary and any suitable user interface may be used for data collection. User interface 200 may be presented on the screen of a device, such as a computer, smartphone, or tablet of voice donor 140. Before beginning to use user interface 200, voice donor 140 may perform other operations. For example, voice donor 140 may register or create an account with the voice bank system and this process may include providing authentication credentials (such as a password) and any relevant information about voice donor 140, such as demographic information.

Before accessing user interface 200, either the first time or for every session, voice donor 140 may provide authentication credentials to help ensure that data provided by voice donor 140 corresponds to the correct individual. User interface 200 may present voice donor 140 with prompt 220, such as the prompt "Hello, how are you today?" User interface 200 may include instructions, either on the same display or another display, that instruct voice donor 140 to speak prompt

220. When voice donor 140 speaks prompt 220, the recording may be continuous, may start and stop automatically, or may be started and stopped by voice donor 140. For example, voice donor 140 may use button 240 to start recording, speak prompt 220, and then press button 240 again to stop recording.

Other buttons on user interface 200 may provide additional functionality. For example, button 230 may cause audio corresponding to prompt 220 to be played using recorded speech or text to speech. Voice donor 140 may want to hear how prompt 220 should be spoken in case voice donor 140 is not familiar with how words should be pronounced. Alternatively, button 230 may allow voice donor 140 to replay his or her own recording to confirm that he or she spoke it correctly. After voice donor 140 has spoken prompt 220, voice donor 140 may proceed to another prompt using button 260, and user interface may then present a different prompt 220. Additionally, voice donor 140 may use button 250 to review a previous prompt 220. Using user interface 200, voice donor may sequentially speak a series of prompts 220.

User interface 200 may present feedback 210 to voice donor 140 to inform voice donor 140 about the status of the voice bank data collection, to entertain voice donor 140, to educate voice donor 140 about the acoustics of his or her own voice, to encourage voice donor 140 to continue providing voice data, or for any other purpose. In the example of FIG. 2, feedback 210 contains a graphical representation that provides information about phonemes spoken by voice donor 140. For example, the graphical representation may include an element for each phoneme in the language of voice donor 140, and the element for each phoneme may indicate how many times voice donor has spoken the phoneme. The arrangements of the elements may correspond to linguistic/acoustic properties of the corresponding phonemes. For example, consonants with a place of articulation in the front of the mouth may be on the left, consonants with a place of articulation in the back of the mouth may be on the right, and vowels may be in the middle. The arrangement of the elements may have an appealing appearance, such as similar to the periodic table in chemistry. In some implementations, the element for each phoneme may have an initial background color (e.g., black) and as the number of times voice donor 140 has spoken that phoneme increases, the background color of the element may gradually transition to another color (e.g., yellow). As voice donor 140 continues in the data collection process, the elements for all the phonemes may transition to another color to indicate that voice donor 140 has provided sufficient data. Other possible feedback is discussed in greater detail below.

User interface 200 may include other elements to facilitate in the data collection process. For example, user interface 200 may include other buttons or menus to allow voice donor 140 to take other actions. For example, voice donor may be able to save his or her progress so far, logout, or review information about the progress of the data collection (e.g., number of prompts spoken, number of prompts remaining until completion, or counts of phonemes spoken).

Figure 3:
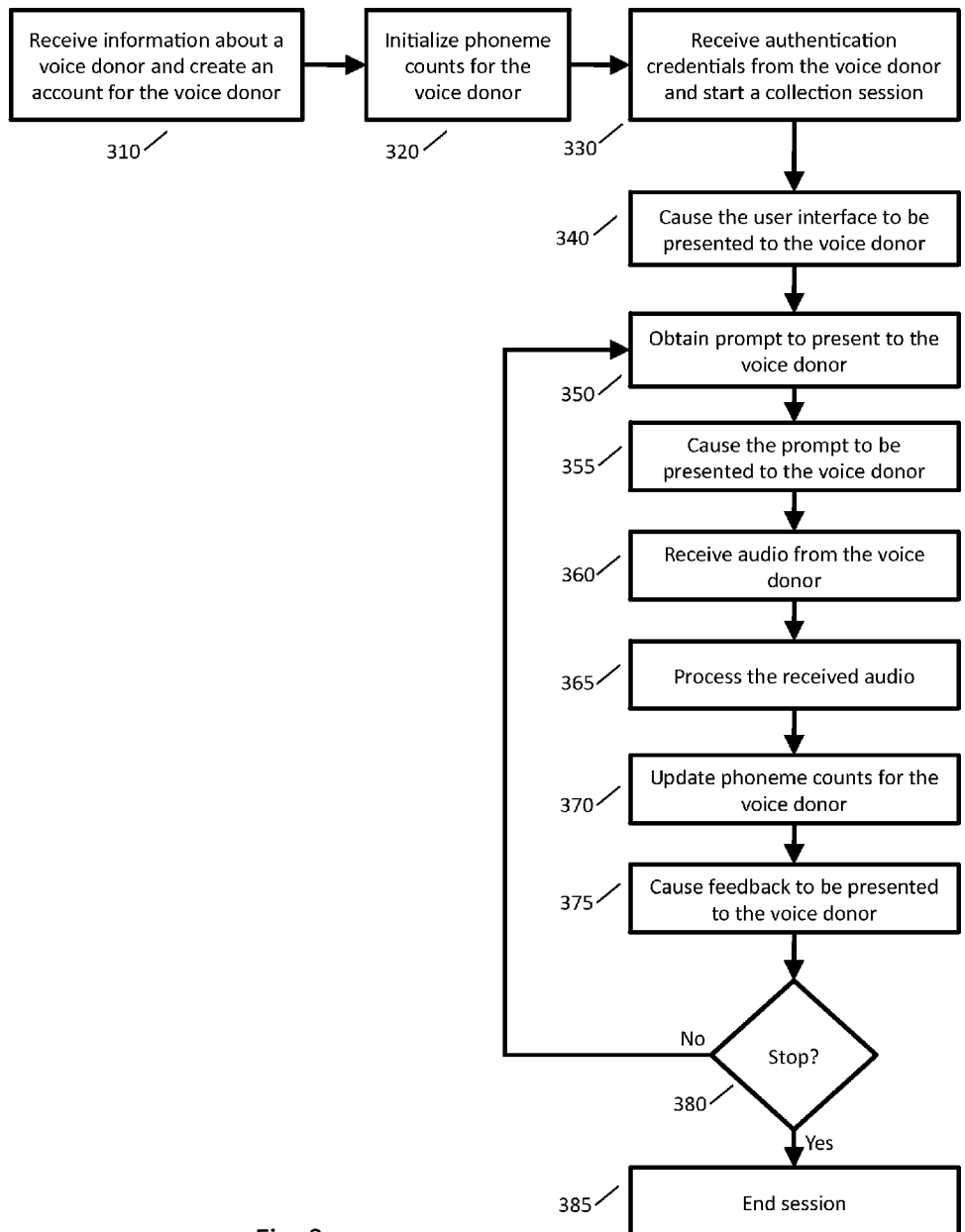
FIG. 3 is a flowchart showing an example implementation of collecting and processing voice data received from voice donors.

FIG. 3 is a flowchart showing an example implementation of collecting and processing voice data. Note that the ordering of the steps of FIG. 3 is exemplary and that other orders are possible. Not all steps are required and, in some implementations, some steps may be omitted or other steps may be added. FIG. 3 may be implemented, for example, by one or more server computers, such as server 110.

At step 310, information may be received about a voice donor and an account may be created for the voice donor. For example, the voice donor may access a web site or an application running on a user device and perform a registration process. The information received about the voice donor may include any information that may assist in collecting voice data from the voice donor, creating a TTS voice using the voice data from the voice donor, or matching the voice donor with a voice recipient. For example, received information may include demographic information, age, gender, weight, height, interests, habits, residence, places lived, and languages spoken. Received information may also include information about relatives or friends. For example, received information may include demographic information, age, gender, residence, places lived, and foreign languages spoken of the parents or friends of the voice donor. In some implementations, received information may include information about social networks of the user to determine if people in the social networks of the voice donor have also registered as voice donors. An account may be created for the voice donor using the received information. For example, a profile may be created for the voice donor using the received information. The voice donor may also create authentication credentials, such as a user name and password, that the voice donor may use in the future when providing voice data, as described in greater detail below.

At step 320, phoneme counts (or counts for other speech units) may be initialized. The phonemes for the phoneme counts may be based, for example, on an international phonetic alphabet, and the phonemes corresponding to the language (or languages) of the speech donor may be selected. In some implementations, phoneme counts may be initialized for phonemes in an international phonetic alphabet even though some of the phonemes are not normally present in the languages spoken by the voice donor. The phoneme counts may be initialized to zero or to other values if other voice data of the voice donor is available. The phoneme counts may be stored using any appropriate techniques such as storing the phoneme counts in a database. In some implementations, the phoneme counts may include counts for phoneme neighborhoods in addition to or instead of counts for individual phonemes.

In some implementations, existing voice data of the voice donor may be available. For example, the voice donor may provide recordings of his or her own voice. The recordings of the voice donor may be processed (e.g., using automatic speech recognition techniques) to determine the phonemes present in the recordings. The provided recordings may be stored in the voice bank, and the phoneme counts may be initialized using the phoneme counts from the recordings.

At step 330, the voice donor may provide his or her authentication credentials to start a collection session. Where the user is progressing immediately from registration to starting a collection session, step 330 may not be necessary. A voice donor may participate in multiple collection sessions. For example, collecting all of the needed voice data from a single voice donor may take a significant period of time, and the voice donor may wish to have multiple, shorter collection sessions instead of one longer session. Before starting each collection session, the voice donor may provide his or her authentication credentials. Requiring a voice donor to provide authentication credentials may prevent another user from intentionally or accidentally providing voice data on behalf of the voice donor.

At step 340, voice collection system 100 may cause a user interface to be presented to the voice donor to enable voice collection, such as the user interface of FIG. 2. Step 340 may occur immediately after step 330 or there may be other intervening steps. In some implementations, an audio calibration may be performed, for example before or after step 340. The audio calibration may determine, for example, an ambient noise level that may be used to inform users about the appropriateness of the recording setting and/or used in later processing.

At step 350 a prompt may be obtained comprising text to be presented to the voice donor. Any appropriate techniques may be used for obtaining a prompt. In some implementations, a list of prompts may be available and each voice donor receives the same prompts in the same order. In some implementations, the prompt may be adapted or customized for the particular voice donor. In some implementations, the prompt may be determined based on characteristics of the voice donor. For example, where the voice donor is a child, a person with a speech disability, or a person speaking a language they are not fluent in, the prompt may be adapted for the speaking capabilities of the voice donor, e.g., the prompt may include simpler or well-known words as opposed to obscure words or the prompt may include words that are easier to pronounce as opposed to words that are harder to pronounce. In some implementations, the prompt may be selected from a list of sentences or phrases commonly needed by disabled people, as obtaining voice data for these sentences and phrases may improve the quality of the TTS-generated speech for these sentences and phrases.

In some implementations, the prompt may be obtained from words the voice donor has previously spoken or written. For example, the voice donor may provide information from a smartphone or other user device or from a social media account, and the prompt may be obtained from these data sources.

In some implementations, the prompt may serve a different purpose. For example, the voice donor may be asked to respond to a prompt instead of repeating the prompt. For example, the prompt may be a question, such as "How are you doing today?" The voice donor may respond, "I am doing great, thank you" instead of repeating the words of the prompt. In another example, the prompt may ask the voice donor to speak a type of phrase, such as "Speak a greeting you would say to a friend." The voice donor may respond, "How's it going?" Other information may be included in the prompt or with the prompt to indicate whether the voice donor should repeat the prompt or say something else in response to a prompt. For example, the text "[REPEAT]" or "[ANSWER QUESTION]" may be presented adjacent to the prompt. Where the voice donor is responding to a prompt rather than speaking a prompt, automatic speech recognition may be used to determine the words spoken by the voice donor.

In some implementations, the prompt may be determined using existing phoneme counts for the voice donor. For example, a prompt may be selected to include one or more phonemes for which the voice donor has lower counts. In some implementations, the prompt may be determined using phoneme neighborhood counts. For example, there may be sufficient counts of phoneme "a" but not sufficient counts of "a" preceded by "k" and followed by "t". By adapting the prompt in this manner, it may be possible to get a required or desired number of counts for each phoneme with a smaller number of total prompts presented to voice donor thus saving time for the voice donor.

At step 355, voice collection system may cause the prompt to be presented to the voice donor, for example, as in the user interface of FIG. 2. In some implementations, the prompt may be presented to the user in conjunction with step 340 and the user interface and a prompt may be presented to the voice donor simultaneously. In some implementations, the user interface may be presented first and may be updated with the prompt using AJAX or other techniques.

In some implementations, the prompt may be read to the user instead of displayed on a screen. For example, a voice donor may choose to have the prompts read instead of displayed so that the voice donor does not need to look at a screen, or a voice donor may not be able to read, such as a young child or a vision-impaired person.

At step 360, voice data is received from the voice donor. The voice data may be in any form that includes information corresponding to the audio spoken by the voice donor, such as an audio signal or a processed audio signal. For example the voice data may include features computed from the audio signal such as mel-frequency cepstral coefficients or may include any prosodic, articulatory, phonatory, resonatory, or respiratory features determined from the audio signal. In some implementations, the voice data may also include video of the voice donor speaking or features computed from video of the voice donor speaking. If the voice donor has followed the instructions, then the voice data will correspond to the voice donor speaking the prompt. The voice donor may provide the voice data using, for example, the user interface of FIG. 2. The voice data received from voice donor (or a processed version of it) may then be stored in a database and associated with the voice donor. For example, the voice data may be encrypted and stored in a database with a pointer to an identifier of the voice donor or may be stored anonymously so it cannot be connected back to the voice donor. In some implementations, the voice data may be stored with other information, such as time and or day of collection. A voice donor's voice may sound differently at different times of day, and it may be desirable to create multiple TTS voices for a voice donor wherein each voice corresponds to a different time of day, such as a morning voice, an afternoon voice, and an evening voice.

In some implementations, steps 350, 355, and 360 may be used to obtain specific kinds of speech, such as speech with different emotions. A prompt may be selected as corresponding to an emotion, such as happy, sad, or angry. The words of the prompt may correspond to the emotion and the voice donor may be requested to speak the prompt with the emotion. When the voice data is received, it may be tagged or otherwise labeled as having the corresponding emotion. By collecting speech with different emotions, TTS voices may be created that are able to generate speech with different emotions.

At step 365, the voice data is processed. A variety of different types of processing may be applied to the voice data. In some implementations, speaker recognition techniques may be applied to the voice data to determine that the voice data was likely spoken by the voice donor as opposed to another person or received video may be processed to verify the identity of the speaker (e.g., using facial recognition technology). Other processing may include determining a quality level of the voice data. For example, a signal to noise ratio may be determined. In some implementations, an analysis may be performed on voice data and/or video to determine if more than one speaker is included in the voice data, such as a background speaker or the voice donor being interrupted by another person. The determination of other speakers may use techniques such as segmentation, diarization, and speaker recognition. A loudness and/or speaking rate (e.g., words or phonemes per second) may also be computed from the voice data to determine if the voice donor spoke too loudly, softly, quickly, or slowly.

The voice data may be processed to determine whether the voice donor correctly spoke the prompt. Automatic speech recognition may be used to convert the voice data to text and the recognized text may be compared with the prompt. Where the speech in the voice data differs too greatly from the prompt, it may be flagged for rejection or to ask the voice donor to say it again. Where the voice donor is responding to a prompt instead of repeating a prompt, automatic speech recognition may be used to determine the words spoken. The automatic speech recognition may use models (such as language models) that are customized to the prompt. For example, where the voice donor is asked to speak a greeting, a language model may be used that is tailored for recognizing greetings. A recognition score or a confidence score produced from the speech recognition may be used to determine a quality of the voice donor's response. Where the recognition score or confidence score is too low, the prompt or response may be flagged for rejection or to ask the voice donor to respond again.

The voice data may also be processed to determine the phonemes spoken by the voice donor. Some words may have more than one allowable pronunciation (such as "aunt" and "roof") or two words in sequence may have multiple pronunciations (such as dropping a final sound of a word, dropping an initial sound of a word, or combing the end of a word with the beginning of the next word). To determine the phonemes spoken by the voice donor, a lexicon of pronunciations may be used and the voice data may be compared to all of the possible allowed pronunciations. For example, the lexicon may contain alternative pronunciations for the words in the prompt, and the pronunciations may be specified, for example, using a phonetic alphabet.

Figure 6:
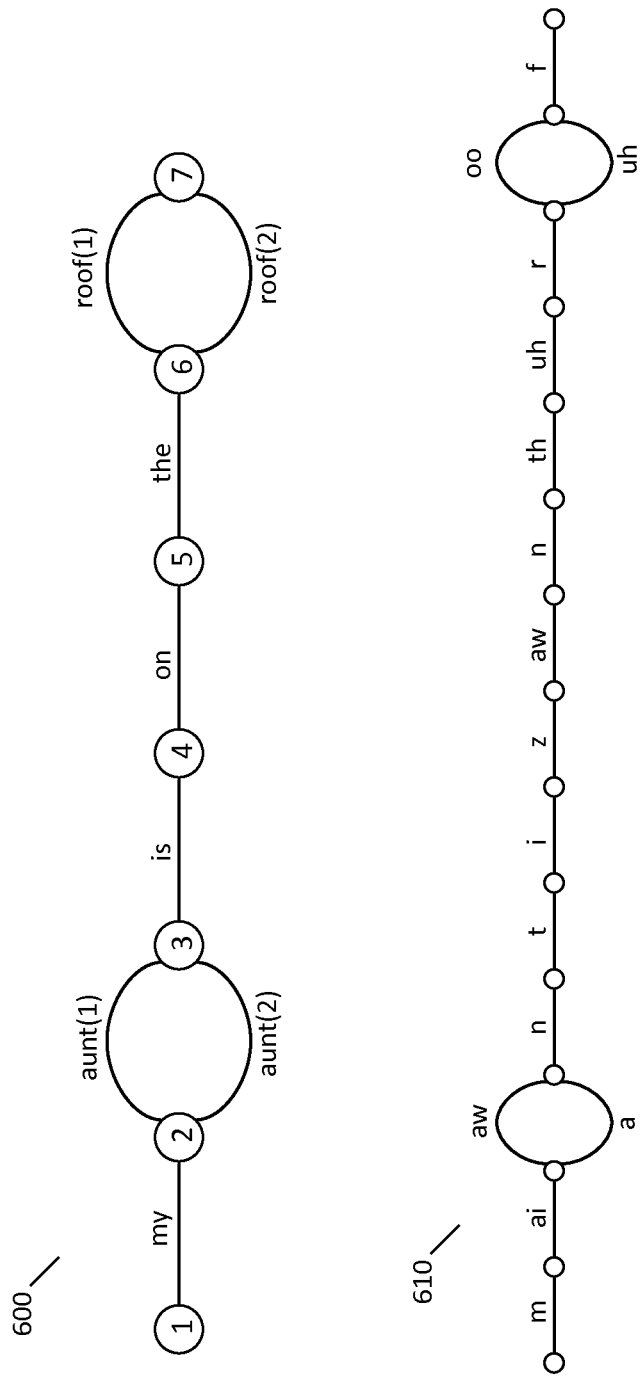
FIG. 6 illustrates an example word graph and phoneme graph for a prompt.

In some implementations, a graph of acceptable pronunciations may be created, such as the word graph 600 or phoneme graph 610 of FIG. 6. Word graph 600 corresponds to the prompt "My aunt is on the roof." For this prompt, the words "aunt" and "roof" may have two pronunciations and the other words may have only one pronunciation. In word graph 600, each of the words is shown on the edges of the graph, but in some implementations the words may be associated with nodes instead of edges. For example, the word "my" is on the edge between node 1 and node 2, the first pronunciation of "aunt" (denoted as aunt(1)) is on a first edge between node 2 and node 3, and the second pronunciation of "aunt" (denoted as aunt(2)) is on a second edge between node 2 and node 3. Similarly, the other words in the prompt are shown on edges between subsequent nodes.

In some implementations, the words in word graph 600 may be replaced with the phonemes (or other speech units) that make up the words. This could be added to word graph 600 or a new graph could be created, such as phoneme graph 610. Phoneme graph 610 has the phonemes on the edges corresponding to the words of word graph 600 and different paths are shown corresponding to different pronunciations.

In some implementations, the phonemes spoken by the voice donor can be determined by performing a forced alignment of the voice data with a word graph or a phoneme graph. For example, the voice data may be converted in to features, such as computing mel-frequency cepstral coefficients every 10 milliseconds. Models may be used to represent how phonemes are pronounced, such as Gaussian mixture models and hidden Markov models. Where hidden Markov models are used, the hidden Markov models may be inserted into a word graph or a phoneme graph. The features from the voice data may then be aligned with the phoneme models. For example algorithms, such as a Viterbi alignment or Baum-Welch estimation, may be used to match the features to a state of a hidden Markov model. The forced alignment may produce an alignment score for the paths through the word graph or phoneme graph and the path having the highest score may be selected as corresponding to the phonemes likely spoken. If a highest path through the graph has a low alignment score, then the voice donor may not have spoken the prompt, and the voice data may be flagged as having low quality.

Voice data that has a low score for any quality level or where the voice donor did not speak the prompt correctly may be rejected or flagged for further review, such as by a human in an offline analysis. Where voice data is rejected, the voice collection system 100 may ask the voice donor to again speak the prompt. A number of poor and/or rejected received voice data items may be counted to determine a quality level for the voice donor.

At step 370, the phoneme counts may be updated for the voice donor using the pronunciation determined in the previous step. This step may be performed conditionally depending on the previous processing. For example, if a quality level of the received voice data is low, this step may not be performed and the voice data may be discarded or the voice donor may be asked to speak the prompt again. In some implementations, the counts may be updated for phoneme neighborhoods. For example, for the word "cat," a count may be added for any of the following: (i) the phoneme "k", (ii) the phoneme "a", (iii) the phoneme "t", (iv) the phoneme neighborhood of "k" preceded by silence, the beginning of a word, or the beginning of an utterance and followed by "a", (v) the phoneme neighborhood of "a" preceded by "k" and followed by "t", or (vi) the phoneme neighborhood of "t" preceded by "a" and followed by silence, the end of a word, or the end of an utterance.

At step 375, feedback may be presented to the user. The feedback presented may take a variety of forms. In some implementations, no feedback is presented or feedback is only presented if there is a problem, such as the voice donor not speaking the prompt correctly or a low quality level. The voice collection system 100 may create instructions (such as using HTML) for displaying the feedback and transmit the instructions to a device of the voice donor, and the device of the voice donor may cause the feedback to be displayed using the instructions.

In some implementations, the feedback may correspond to presenting a graphical representation, such as the graphical representation 210 in FIG. 2. For example, the graphical representation may include elements for different phonemes and the color or other attribute of the elements may be set to correspond to the phoneme count information.

In some implementations, the feedback may correspond to a quality level or a comparison of what the voice donor spoke to the prompt. For example, the feedback may indicate that the noise level was too high or that another speaker was detected and ask the voice donor to speak the prompt again. In another example, the feedback may indicate that the user spoke an additional word, skipped a word, stuttered when saying a word, or congratulate the voice donor for speaking the prompt correctly.

In some implementations, the feedback may inform the voice donor of the progress of the data collection. For example, the feedback may indicate a number of prompts spoken versus a desired number of total prompts, a number of times a particular phoneme has been spoken as compared to a desired number, or a percentage of phonemes for which a sufficient number of samples have been collected.

In some implementations, the feedback may be educational. For example, the feedback may indicate that the prompt included the phoneme "A" followed by the phoneme "B" and this combination of phonemes is common or rare. The feedback may indicate that the voice donor speaks a word (e.g., "aunt") in a manner that is common in some regions and different in other regions.

In some implementations, the feedback may be motivational to encourage the voice donor to continue providing further voice samples. For example, the feedback may indicate that the voice donor has provided a number of samples of phoneme "A" and that the is the largest number of samples of the phoneme "A" ever provided by the voice donor in a single session. In some implementations, the voice donor may receive certificates indicating various progress levels in the data collection process. For example, certificate may be provided after the voice donor has spoken 500 prompts or provided sufficient data to allow the creation of a TTS voice.

In some implementations, the feedback may be part of a game or gamified. For example, the progress of the voice donor may be compared to the progress of other voice donors known by the voice donor. A voice donor who reaches a certain level in the data collection process first may be considered a winner or receive an award.

At step 380, it is determined whether to continue with the current session of data collection or to stop. If it is determined to continue, then processing continues to step 350 where another prompt (or perhaps the same prompt) is presented to the voice donor. If it is determined to stop, then processing continues to step 385. The determination of whether to stop or continue may be determined by a variety of factors. The voice donor way wish to stop providing data, for example, and close the application or web browser or may click a button ending the session. In some implementations, a session may automatically stop after the user has spoken a specified number of prompts, and the number of prompts may be set by the voice donor or the voice collection system 100. In some implementations, voice data of the user may be analyzed to determine a fatigue of the user, and the session may end to maintain a desired quality level.

At step 385, the voice collection session is ended. The voice collection system 100 may cause a different user interface to be presented to the user, for example, to thank the voice donor for his or her participation or to provide a summary of the progress of the data collection to date. At the end of the session other processing may be performed. For example, the voice data received during the session may be processed to clean up the voice data (e.g., reduce noise or eliminate silence), to put the voice data in a different format (e.g., computing features to be used to later generate a TTS voice), or to create or update a TTS voice corresponding to the voice donor. In some implementations, the voice data for the session may be analyzed to determine characteristics of the voice donor during the session. For example, by processing the voice data for a session, it may be determined that the voice donor likely had a cold that day or some other medical condition that altered the sound of the voice donor's voice.

The voice data for the voice donor (either for a session or all the voice data of a voice donor) may be processed to determine information about the voice donor. For example, the received voice data may be automatically processed to determine an age or gender of the voice donor. This may be used to confirm information provided by the voice donor or used where the voice donor does not provide such information. The received voice data may also be processed to determine likely regions where the voice donor currently lives or has lived in the past. For example, how the voice donor pronounces particular words or accents of the voice donor may indicate a region where the donor currently lives or has lived in the past.

After step 385, a voice donor may later create a new session by going back to the website or application, logging in at step 330, and proceeding as described above. A voice donor may perform one session or may perform many sessions.

The collecting and processing of voice data described above may be performed by any number of voice donors, and the voice donors may come from all over the world and donate their voices in different languages. Where the voice collection system 100 is widely available, such as by being accessible on a web page, a large number of voice donors may provide voice data, and this collection of voice data may be referred to as a voice bank.

In some implementations, an analysis of voices in the voice bank may be used to provide interesting or educational information to a voice donor. For example, a voice donor's friends or relatives may also be voice donors. The voice of a voice donor may be compared with the parent or friend of the voice donor to identify differences in speaking styles and suggest possible explanations for the differences. For example, because of age, differences in local accents over time, or places lived, a parent and child may have differences in their voices. These differences may be identified (e.g., speaking words in different ways) and a possible reason given for the difference (e.g., the parent grew up in the south and the child grew up in Boston).

In some implementations, the voice bank may be analyzed to determine the coverage of different types of voices. Each of the voices may be associated with different criteria, such as the age, gender, and location of the voice donor. The distributions of received voices may be determined for one or more of these criteria. For example, it may be determined that there is not sufficient voice data for voice donors from the state of North Dakota. The distributions may also be across multiple criteria. For example, it may be determined that there is not sufficient data for women aged 50-54 from North Dakota or that there is not sufficient data for people living in the United States who were born in France. After identifying characteristics of voice donors, steps may be to taken to identify donors meeting the needed characteristics. For example, targeted advertising may be used, or the social networks of known donors may be analyzed to identify individuals who likely meet the needed characteristics.

The data in the voice bank may be used for a variety of applications. For example, the voice bank data may be used (1) to create or select TTS voices, such as for people who are not able to speak, (2) for modeling how voices change over time, (3) for diagnostic or therapeutic purposes to assess an individual's speaking capability, (4) to determine information about a person by matching the person's voice to voices in the voice bank, or (5) for foreign language learning.

A TTS voice may be created using the voice data received from voice donors. Any known techniques for creating a TTS voice may be used. For example, a TTS voice may be created using concatenative TTS techniques or parametric TTS techniques (e.g., using hidden Markov models).

With concatenative TTS techniques, the voice data may be segmented into portions corresponding to speech units (such as diphones), and the segments may be concatenated to create the synthesized speech. To improve the quality of the synthesized speech, multiple segments corresponding to each speech unit may be stored. When selecting speech segments to use to synthesize the speech, a cost function may be used. For example, a cost function may have a target cost for how well the segment matches the desired speech (e.g., using linguistic properties such as position in word, position in utterance, pitch, etc.) and a join cost for how well the segment matches previous segments and following segments. A sequence of segments may be chose to synthesize the desired speech while minimizing an overall cost function.

With parametric TTS techniques, parameters or characteristics may be used that represent the vocal excitation source and the shape of the vocal tract. In some implementations, the vocal excitation source may be represented using source line-spectral frequencies, harmonics-to-noise ratio, fundamental frequency, differences between the first two harmonics of the voicing source, and/or a normalized-amplitude quotient. In some implementations, the vocal tract may be represented using mel-frequency cepstral coefficients, linear predictive coefficients, and/or line-spectral frequencies. An additional gain parameter may also be computed to represent the amplitude of the speech. The voice data may be used to estimate parameters of the vocal excitation source and the vocal tract. For example, techniques such as linear predictive coding, maximum likelihood estimation, and Baum-Welch estimation may be used to estimate the parameters. In some implementations, speech may be generated using the estimated parameters and hidden Markov models.

A TTS voice may also be created by combining voice data from multiple voice donors. For example, where a first donor has not provided enough voice data to create a TTS voice solely from the first donor's voice data, a combination of voice data from the first voice donor and a second voice donor may provide enough data to create a TTS voice. In some implementations, multiple voice donors with similar characteristics may be selected to create a TTS voice. The relevant characteristics may include age, gender, location, and auditory characteristics of the voice, such as pitch, loudness, breathiness, or nasality. The voice data of the multiple voice donors may be treated as if it was coming from a single donor in creating a TTS voice.

Figure 4:
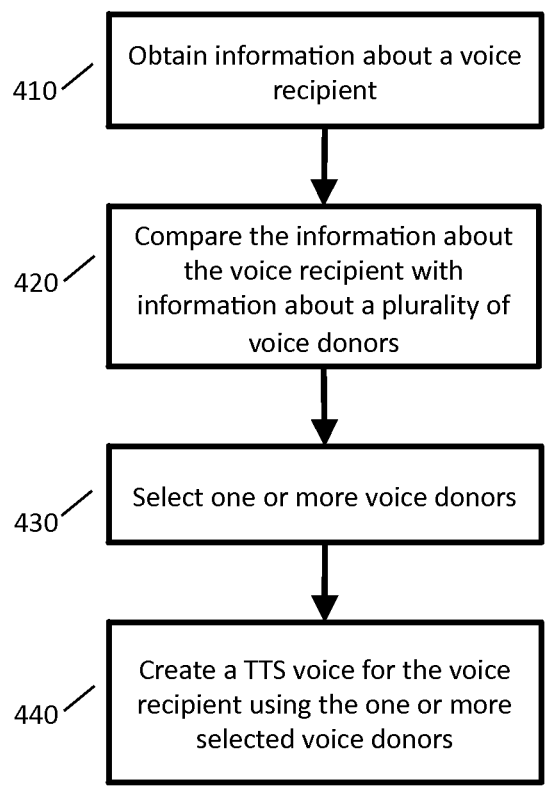
FIG. 4 is a flowchart showing an example implementation of obtaining a TTS voice for a voice recipient.

FIG. 4 is a flowchart showing an example implementation for obtaining a TTS voice for a voice recipient. Note that the ordering of the steps of FIG. 4 is exemplary and that other orders are possible. Not all steps are required and, in some implementations, some steps may be omitted or other steps may be added. FIG. 4 may be implemented, for example, by one or more server computers, such as server 110.

At step 410, information is obtained about a voice recipient. In some implementations, the voice recipient may not be able to speak and the information about the voice recipient may include non-vocal characteristics, such as the age, gender, and location of the voice recipient. A voice recipient who is not able to speak may additionally provide desired characteristics for a TTS voice, such as in the form of pitch, loudness, breathiness, or nasality. In some implementations, the voice recipient may have some limited ability to generate sounds but not be able to generate speech. For example, the voice recipient may be able to make a sustained vowel sound. The sounds obtained from the voice recipient may be processed to determine vocal characteristics of the sounds. For example, a pitch, loudness, breathiness, or nasality of the sounds may be determined. Any existing techniques may be used to determine vocal characteristics of the voice recipient. In some implementations, the voice recipient may be able to produce speech, and vocal characteristics of the voice recipient may be determined from the voice recipient's speech.

In some implementations, the vocal characteristics of the voice recipient or voice donor may include loudness, pitch, breathiness, or nasality. For example, loudness may be determined by computing an average RMS energy in a speech signal. Pitch may be determined using a mean fundamental frequency computed over the entire speech signal, such as by using an autocorrelation of the speech signal with built-in corrections to remove values that are not feasible. Breathiness may be determined by using a cepstral peak prominence, which may be computed using a peak value of the cepstrum of the estimated voicing source in the speech signal. Nasality may be determined using a spectral tilt, which may be computed using a difference between an amplitude of the first formant and the first harmonic of the speech spectrum. These characteristics may take a range of values (e.g., 0-100) or may take a binary value. To obtain a binary value, an initial non-binary value may be compared against a threshold (such as a gender-based threshold, an age-based threshold, or a threshold determined using human perceptual judgments) to determine a corresponding binary label. With binary values, combinations of the four characteristics generate 16 possible voice types.

In some implementations, step 410 may correspond to a voice recipient specifying desired characteristics of a voice instead of characteristics of the actual voice recipient. A user interface may be provided to allow the voice recipient to specify the desired characteristics and hear a sample of a voice with those characteristics. A user interface may include fields to specify any of the characteristics described above (age, gender, pitch, nasality, etc.). For example, a user interface may include a slider that allows the voice recipient to specify a value of a characteristic across a range (e.g., nasality ranging from 0% to 100%). After the voice recipient has provided one or more desired characteristics, one or more voice samples may be provided or a list of voice donors who match the characteristics may be provided.

At step 420, the information about the voice recipient may be compared with information about voice donors in the voice bank. The information about the voice donors may include any of the information described above. The comparison between the voice donors and the voice recipients may be performed using any appropriate techniques and may depend on the information obtained from the voice recipient.

In some implementations, the comparison may include a distance measure or a weighted distance measure between the voice recipient and voice donors. For example, a magnitude difference or difference squared between a characteristic of the voice recipient and voice donors may be used, and different weights may be used for different characteristics. If $A_r$ is the age of the voice recipient, $A_d$ is an age of a voice donor, $L_r$ is the location of the voice recipient (e.g., in latitude and longitude), La is a location of a voice donor, $W_1$ is a first weight, and $W_2$ is a second weight, then a distance measure may correspond to $W_1(A_r-A_d)^2 + W_2(L_r-L_d)^2$.

In some implementations, the comparison may include comparing vocal qualities of the donor and recipient. The vocal characteristics (such as pitch, loudness, breathiness, or nasality) of each donor or recipient may be given a value corresponding to the characteristic and the values may be compared, for example, using a distance measure as described above. In some implementations, more detailed representations of a donor or recipient's voice may be used, such as an ivector or an eigenvoice. For example, any techniques used for speaker recognition may be used to compare the voices of donors and recipients.

At step 430, one or more voice donors are selected. In some implementations, a single best matching voice donor is selected. Where a best matching donor does not have sufficient voice data, additional voice donors may also be selected to obtain sufficient voice data to create a TTS voice. In some implementations, multiple voice donors may be selected and blended to create a voice that matches the voice recipient. For example, if the voice recipient is 14 years old, the voice of a 16-year-old donor and the voice of a 12-year-old donor may be selected.

At step 440, a TTS voice is obtained or created for the voice recipient. Where only a single voice donor is selected, an existing TTS voice for the voice donor may be already exist and be retrieved from a data store of TTS voices. In some implementations, where multiple voice donors are selected, a TTS voice may be created by combining the voice data of the multiple selected voice donors and creating a TTS voice from the combined data. In some implementations, where multiple donors are selected, a TTS voice may be obtained for each donor and the TTS voices for the donors may be morphed or blended.

In some implementations, multiple TTS voices may be created for a voice recipient. For example, as noted above, different TTS voices may be created for different times of day or for different emotions. The voice recipient may then switch between different TTS voices automatically or based on a selection. For example, a morning TTS voice may automatically be used before noon or the voice recipient may select a happy TTS voice when he or she is happy.

In some implementations, a TTS voice created for a recipient may be modified to change the characteristics of the voice and this modification may be performed manually or automatically. For example, the parameters of the TTS voice may be modified to correspond to how a voice sounds at different times of day (e.g., a morning, afternoon, or evening voice), different contexts of use (e.g. speaking to peer, caregiver, boss, etc.), or may be modified to present different emotions.

In some implementations, TTS voices of one or more donors may be modified to resemble characteristics of the voice recipient. For example, where the voice recipient is able to generate some speech (e.g., a sustained vowel), vocal characteristics of the voice recipient may be determined, such as the pitch of the recipient's speech. The characteristics of the voice recipient's voice may then be used to modify the TTS voices of one or more donors. For example, parameters of the one or more TTS voices may be modified so that the TTS voice matches the recipient's voice characteristic.

In some implementations, voice blending or morphing may include a single voice donor to single recipient or multiple voice donors to a single recipient. With a single voice donor, vocal tract related information of the voice donor speech may be separated from the voicing source information. For the voice recipient, vocal tract related information may also be separated from the voicing source information. To produce the morphed speech, the voicing source of the voice recipient may be combined with the vocal tract information of the voice donor to produce morphed speech. For example, this morphing may be done using a vocoder that is able to parameterize both the vocal tract and voice source information. When using multiple voice donors, several parallel speech corpora may be used to train a canonical Gaussian mixture model voice model and this canonical model may be adapted using features of the donor voices and the recipient voice. This approach may be adapted to voice morphing by using an explicit voice parameterization as part of the feature set and training the model using donor voices that are most similar to the recipient voice.

In some implementations, a voice bank may be used to model how voices change as people age. For example, a person's voice sounds quite different when that person is 10 years old, 40 years old, and 80 years old. Given a TTS voice for a person who is 10 years old, a model of voice aging may be used to create a voice for how one expects that person to sound when that person is older. The voice donors in the voice bank may include people of all ages from young children to the elderly. By using the voice data of multiple voice donors of different ages, a model may be created that generally describes how voices change as people age.

A TTS voice may be parametric and include, for example, parameters corresponding to the vocal excitation source and the shape of the vocal tract. For an individual, these parameters will change as the individual gets older. A voice aging model may describe how the parameters of a TTS voice change as a person ages. By applying the model to an existing TTS voice, the TTS voice may be altered to reflect how we expect the person to sound at a different age.

In some implementations, a voice aging model may be created using regression analysis. In doing regression analysis, the independent variable may be age, and the dependent variables may be a set of parameters of the TTS voice (such as parameters or features relating to the vocal source, pitch, spectral distribution, etc). By using values of the parameters, a linear or non-linear manifold may be fit to the data to determine generally how the parameters change as people age. This analysis may be performed for some or all of the parameters of a TTS voice.

In some implementations, a voice aging model may be created using a subset of the voice donors in the voice bank. For example, an aging model may be created for men and an aging model may be created for women. A voice aging model may also be created that is more specific to a particular voice type. For example, for the particular voice type, voice donors may be selected from the voice bank whose voices are the most similar to the particular voice type (e.g., the 100 closest voices). An aging model may then be created using the voice donors who are most similar to the particular voice type.

In some implementations, voice donors may provide voice data for an extended period of time, such as over 1 year, 5 years, 20 years, or even longer. This voice data may also be used to model how a given individual's voices changes over time.

Where a voice donor has provided voice data for an extended period of time, multiple TTS voices may be created for that voice donor using voice data collected during different time periods. For example, for that voice donor, a first TTS voice may be created using voice data collected when the voice donor was 12 years old, a second TTS voice may be created using voice data collected when the voice donor was 25 years old, and a third TTS voice may be created using voice data collected when the voice donor was 37 years old.

The TTS voices corresponding to different ages of a single voice donor may be used to learn how that voice donor's voice changes over time, for example, by using the regression techniques described above. By using TTS voices from a single voice donor corresponding to multiple ages of the voice donor, a more accurate voice aging model may be determined.

A voice aging model may be used when providing TTS voices to voice recipients. For example, a voice donor may donate his or her voice at age 14, and the voice donor may later lose his or her voice (e.g., via an accident or illness). The voice donor may later desire to become a voice recipient. By using a voice aging model, an age appropriate voice may be provided throughout the person's lifetime. For example, the TTS voice created from age 14, may be modified using an aging model to provide TTS voices at regular intervals, such as every 5 years.

In another example, the voice recipient may not have been a previous voice donor, but the best matching voice from the voice bank may correspond to a different age. For example, the voice recipient may be 12 years old and the best matching voice donor may be 40 years old. The 40-year-old voice of the voice donor may modified using the voice aging model to sound like the voice of a 12 year old. As above, TTS voices may be provided at regular intervals as the voice recipient ages.

The parameters of a TTS voice may be modified with a voice aging model using any appropriate techniques. For example, for a TTS voice, the aging model may correspond to a manifold. This manifold may be translated to coincide with the parameters of the TTS voice to be modified at the corresponding age. The translated manifold may then be used to determine appropriate parameters for the TTS voice at different ages.

In some implementations, a voice bank may be used for diagnostic or therapeutic purposes. For an individual being diagnosed, one or more canonical voices can be determined based the characteristics of the individual. The manner of speaking of the individual may then be compared to the one or more canonical voices to determine similarities and differences between the voice of the individual and the one or more canonical voices. The differences may then be evaluated, either automatically or by a medical professional, to help instruct the individual to correct his or her speech. In some implementations, the speech of the individual may be collected at different times, such as at a first time and a second time. The first and second times may be separated by an event (such as a traumatic event or a change in health) or may be separated by a length of time, such as many years. By comparing the voice of the individual at different times, the changes in the individual's voice may be determined and used to instruct the individual to correct his or her speech. When comparing the voice of the individual at different times, a voice aging model may be used to remove differences accountable to aging to better focus on the differences relevant to the diagnosis.

In some implementations, a voice bank may be used to automatically determine information about a person. For example, when a person calls a company (or other entity), the person may be speaking with another person or a computer (through speech recognition and TTS). The company may desire to determine information about the person using the person's voice. The company may use a voice bank or a service provided by another company who has a voice bank to determine information about the person.

The company may create a request for information about the person that includes voice data of the person (such as any of the voice data described above). The request may be transmitted to its own service or a service available elsewhere. The recipient of the request may compare the voice data in the request to the voice donors in the voice bank, and may select one or more voice donors whose voices most closely match the voice data of the person. For example, it may be determined that the individual most closely matches a 44 year old male from Boston whose parents were born in Ireland. From the one or more matching voice donors, likely characteristics may be determined and each characteristic may be associated with a likelihood or a score. For example, it may be 95% likely the person is male, 80% likely the person is from Boston, 70% likely the person is 40-45 years old, and 40% likely the person's parents were born in Ireland. The service may return some or all of this information. For example, the service may only return information that is at least 50% likely.

The company may use this information for a variety of purposes. For example, the company may select a TTS voice to use with the individual that sounds like speech where the individual lives. For example, if the individual appears to be from Boston, a TTS voice with a Boston accent may be selected or if the individual appears to be from the south, then a southern accent may be selected. In some implementations, the information about the individual may be used to verify who he or she claims to be. For example, if the individual is calling his bank and gives a name, the bank could compare the information determined from the individual's voice with known information about the named person to evaluate if the individual is really that person. In some implementations, the information about the individual may be used for targeted advertising or targeted marketing.

In some implementations, a voice bank may be used for foreign language learning. When learning a new language, it can be difficult for the learner to pronounce phonemes that are not present in his or her language. To help the learner learn how to pronounce these new phonemes, a voice may be selected from the voice bank of a native speaker of the language being learned who most closely matches the voice of the individual learning the language. By using this TTS voice with the language learner, it may be easier for the language learner to learn how to pronounce new phonemes.

Figure 5:
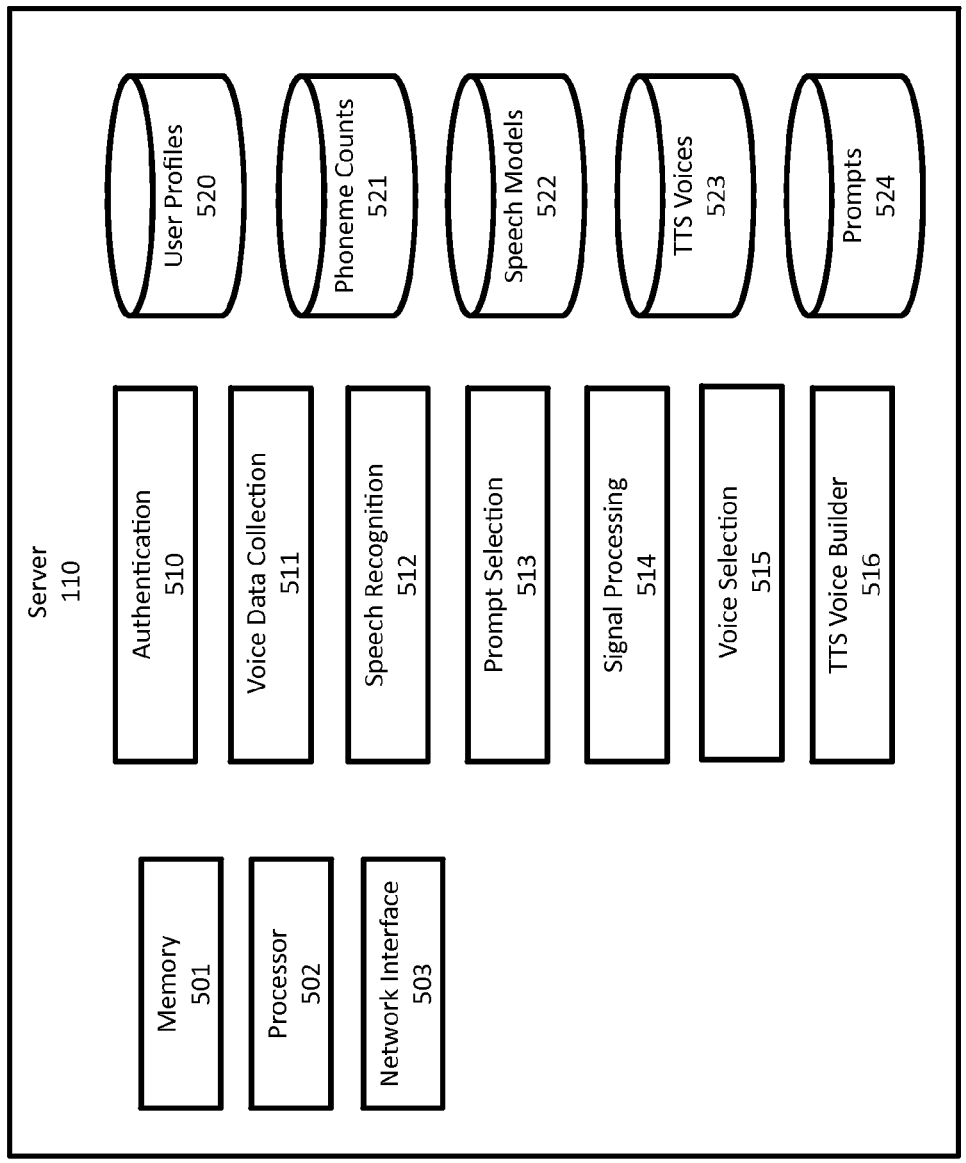
FIG. 5 illustrates an example of one or more server computers that may be used to collect and process voice data received from voice donors.

FIG. 5 illustrates components of one implementation of a server 110 for receiving and processing voice data or creating a TTS voice from voice data. In FIG. 5 the components are shown as being on a single server computer, but the components may be distributed among multiple server computers. For example, some servers could implement voice data collection and other servers could implement TTS voice building. Further, some of these operations could by performed by other computers, such as a device of voice donor 140.

Server 110 may include any components typical of a computing device, such one or more processors 502, volatile or nonvolatile memory 501, and one or more network interfaces 503. Server 110 may also include any input and output components, such as displays, keyboards, and touch screens. Server 110 may also include a variety of components or modules providing specific functionality, and these components or modules may be implemented in software, hardware, or a combination thereof. Below, several examples of components are described for one example implementation, and other implementations may include additional components or exclude some of the components described below.

Server 110 may include or have access to various data stores, such as data stores 520, 521, 522, 523, and 524. Data stores may use any known storage technology such as files or relational or non-relational databases. For example server 110 may have a user profiles data store 520. User profiles data store 520 may have an entry for each voice donor, and may include information about the donor, such as authentication credentials, information received from the voice donor (e.g., age, location, etc.), information determined about a voice donor from received voice data (e.g., age, gender, etc.), or information about a voice donor's progress in the voice data collection (e.g., number of prompts recorded). Server 110 may have a phoneme counts data store 521 (or counts for other types of speech units), which may include a count of each phoneme spoken by a voice donor. Server 110 may have a speech models data store 522, such as speech models that may be used for speech recognition or forced alignment (e.g., acoustic models, language models, lexicons, etc.). Server 110 may have a TTS voices data store 523, which may include TTS voices created using voice data of voice donors or combinations of voice donors. Server 110 may have a prompts data store 524, which may include any prompts to be presented to a voice donor.

Server 110 may have an authentication component 510 for authenticating a voice donor. For example, a voice donor may provide authentication credentials and the authentication component may compare the received authentication credentials with stored authentication credentials (such as from user profiles 520) to authenticate the voice donor and allow him or her access to voice collection system 100. Server 110 may have a voice data collection component 511 that manages providing a device of the voice donor with a prompt, receiving voice data from the device of the user, and then storing or causing the received voice data to be further processed. Server 110 may have a speech recognition component 512 that may perform speech recognition on received voice data to determine what the voice donor said or to compare what the voice donor said to a phonetic representation of the prompt (e.g., via a forced alignment). Server 110 may have a prompt selection component 513 that may select a prompt to be presented to a voice donor using any of the techniques described above. Server 110 may have a signal processing component 514 that may perform a variety of signal processing on received voice data, such as determining a noise level or a number of speakers in voice data. Server 110 may have a voice selection component 515 that may receive information or characteristics of a voice recipient and select one or more voice donors who are similar to the voice recipient. Server 110 may have a TTS voice builder component 516 that may create a TTS voice using voice data of one or more voice donors.

Depending on the implementation, steps of any of the techniques described above may be performed in a different sequence, may be combined, may be split into multiple steps, or may not be performed at all. The steps may be performed by a general purpose computer, may be performed by a computer specialized for a particular application, may be performed by a single computer or processor, may be performed by multiple computers or processers, may be performed sequentially, or may be performed simultaneously.

The techniques described above may be implemented in hardware, in software, or a combination of hardware and software. The choice of implementing any portion of the above techniques in hardware or software may depend on the requirements of a particular implementation. A software module or program code may reside in volatile memory, non-volatile memory, RAM, flash memory, ROM, EPROM, or any other form of a non-transitory computer-readable storage medium.

Conditional language used herein, such as, "can," "could," "might," "may," "e.g.," is intended to convey that certain implementations include, while other implementations do not include, certain features, elements and/or steps. Thus, such conditional language indicates that that features, elements and/or steps are not required for some implementations. The terms "comprising," "including," "having," and the like are synonymous, used in an open-ended fashion, and do not exclude additional elements, features, acts, operations. The term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood to convey that an item, term, etc. may be either X, Y or Z, or a combination thereof. Thus, such conjunctive language is not intended to imply that certain embodiments require at least one of X, at least one of Y and at least one of Z to each be present.

While the above detailed description has shown, described and pointed out novel features as applied to various implementations, it can be understood that various omissions, substitutions and changes in the form and details of the devices or techniques illustrated may be made without departing from the spirit of the disclosure. The scope of inventions disclosed herein is indicated by the appended claims rather than by the foregoing description. All changes which come within the meaning and range of equivalency of the claims are to be embraced within their scope.

What is claimed is:

1. A computer-implemented method for collecting voice data from a plurality of users, the method performed by one or more server computers and comprising:
   storing speech unit count information for each user of the plurality of users, wherein the speech unit count information for a user includes a count for each speech unit of a plurality of speech units;
   receiving first authentication credentials from a first user device, wherein the authentication credentials correspond to a first user of the plurality of users;
   transmitting a first prompt to the first user device;
   receiving first voice data from the first user device, wherein the first voice data corresponds to the first user speaking the first prompt;
   storing the first voice data or a processed version of the first voice data;
   obtaining one or more phonetic representations of the first prompt;
   determining a first sequence of speech units corresponding to the first voice data using the one or more phonetic representations of the first prompt;
   modifying first speech unit count information corresponding to the first user using the first sequence of speech units;
   selecting a second prompt;
   transmitting the second prompt to the first user device;
   receiving second voice data from the first user device, wherein the second voice data corresponds to the first user speaking the second prompt; and
   storing the second voice data or a processed version of the second voice data.

2. The computer-implemented method of claim 1, further comprising:
   determining a quality level of the first voice data; and
   wherein modifying the first speech unit count information corresponding to the first user is in response to the quality level exceeding a threshold.

3. The computer-implemented method of claim 2, wherein determining the quality level of the first voice data comprises at least one of determining a noise level of the first voice data, counting a number of speakers in the first voice data, or determining an alignment score of the first voice data against the one or more phonetic representations of the first prompt.

4. The computer-implemented method of claim 1, wherein the one or more phonetic representations of the first prompt comprise alternative pronunciations of the first prompt.

5. The computer-implemented method of claim 1, further comprising:
   transmitting to the first user device at least one of the first speech unit count information, a quality level of the first voice data, a progress of the first user through a sequence of prompts, or linguistic information corresponding to the first prompt or the first voice data.

6. The computer-implemented method of claim 1, further comprising:
   receiving authentication credentials from a second user device, wherein the second user device is remote from the one or more server computers and wherein the authentication credentials correspond to a second user;
   transmitting a third prompt to the second user device;
   receiving third voice data from the second user device, wherein the third voice data corresponds to the second user speaking the third prompt;

obtaining one or more phonetic representations of the third prompt;
determining a third sequence of speech units corresponding to the third voice data using the one or more phonetic representations of the third prompt;
modifying second speech unit count information corresponding to the second user using the third sequence of speech units.

7. The computer-implemented method of claim 1, further comprising:
creating instructions for displaying a graphical representation of the first speech unit count information, wherein the graphical representation comprises a first element indicating a first count for a first speech unit and a second element indicating a second count for a second speech unit; and
transmitting the instructions to the first user device.

8. The computer-implemented method of claim 1, further comprising:
receiving a request for information about a person, the request comprising voice data of the person;
selecting one or more users of the plurality of users by processing the voice data of the person, wherein selecting the one or more users is based at least in part on a similarity of the voice data of the one or more users and the voice data of the person;
obtaining information corresponding to the one or more users; and
transmitting the information corresponding to the one or more users.

9. The computer-implemented method of claim 1, wherein selecting the second prompt comprises selecting the second prompt using the first speech unit count information.

10. A system for collecting voice data from a plurality of users, the system comprising:
one or more computing devices comprising at least one processor and at least one memory, the one or more computing devices configured to:
store speech unit count information for each user of the plurality of users, wherein the speech unit count information for a user includes a count for each speech unit of a plurality of speech units;
receive first authentication credentials from a first user device, wherein the authentication credentials correspond to a first user of the plurality of users;
transmit a first prompt to the first user device;
receive first voice data from the first user device, wherein the first voice data corresponds to the first user speaking the first prompt;
obtain one or more phonetic representations of the first prompt;
determine a first sequence of speech units corresponding to the first voice data using the one or more phonetic representations of the first prompt;
modify first speech unit count information corresponding to the first user using the first sequence of speech units;
select a second prompt;
transmit the second prompt to the first user device;
receive second voice data from the first user device, wherein the second voice data corresponds to the first user speaking the second prompt.

11. The system of claim 10, wherein the one or more computing devices are further configured to:
receive information corresponding to a voice characteristic;
select one or more users of the plurality of users using the information corresponding to the voice characteristic;
create a text-to-speech voice using voice data corresponding to the selected one or more users.

12. The system of claim 11, wherein the information corresponding to the voice characteristic comprises information about pitch, loudness, breathiness, or nasality.

13. The system of claim 11, wherein the one or more computing devices are configured to select the user of the plurality of users by using information about the first user corresponding to demographics, age, gender, height, languages spoken, or places lived.

14. The system of claim 10, wherein the one or more computing devices are further configured to:
receive from the first user device information about the first user comprising demographic information, age, gender, height, languages spoken, accent, or places lived.

15. The system of claim 10, wherein the one or more computing devices are further configured to:
process voice data corresponding to the first user to estimate information about the first user comprising demographic information, age, gender, height, languages spoken, accent, or places lived.

16. The system of claim 10, wherein the one or more computing devices are further configured to:
create instructions for displaying a graphical representation of the first speech unit count information, wherein the graphical representation comprises a first element indicating a first count for a first speech unit and a second element indicating a second count for a second speech unit; and
transmit the instructions to the first user device.

17. The system of claim 10, wherein the one or more computing devices are further configured to select the second prompt using the first speech unit count information.

18. One or more non-transitory computer-readable media comprising computer executable instructions that, when executed, cause at least one processor to perform actions comprising:
storing speech unit count information for each user of the plurality of users, wherein the speech unit count information for a user includes a count for each speech unit of a plurality of speech units;
receiving first authentication credentials from a first user device, wherein the authentication credentials correspond to a first user of the plurality of users;
transmitting a first prompt to the first user device;
receiving first voice data from the first user device, wherein the first voice data corresponds to the first user speaking the first prompt;
obtaining one or more phonetic representations of the first prompt;
determining a first sequence of speech units corresponding to the first voice data using the one or more phonetic representations of the first prompt;
modifying first speech unit count information corresponding to the first user using the first sequence of speech units;
selecting a second prompt;
transmitting the second prompt to the first user device;
receiving second voice data from the first user device, wherein the second voice data corresponds to the first user speaking the second prompt.

19. The one or more non-transitory computer-readable media of claim 18, wherein the first voice data comprises an audio signal or a video signal.

20. The one or more non-transitory computer-readable media of claim 18, wherein selecting the second prompt comprises selecting the second prompt using the speech unit count information.

21. The one or more non-transitory computer-readable media of claim 18, the actions further comprising:
    creating instructions for displaying a graphical representation of the first speech unit count information, wherein the graphical representation comprises a first element indicating a first count for a first speech unit and a second element indicating a second count for a second speech unit; and
    transmitting the instructions to the first user device.

22. The one or more non-transitory computer-readable media of claim 18, the actions further comprising:
    creating instructions for displaying a progress of voice data collection for the first user; and
    transmitting the instructions to the first user device.

23. The one or more non-transitory computer-readable media of claim 18, wherein the plurality of speech units correspond to an international phonetic alphabet.

24. The one or more non-transitory computer-readable media of claim 18, the actions further comprising:
    obtaining third voice data corresponding to a second user;
    creating a first TTS voice using the third voice data;
    obtaining fourth voice data corresponding to a third user;
    creating a second TTS voice using the fourth voice data; and
    creating a voice aging model using the first TTS voice and the second TTS voice.

25. The one or more non-transitory computer-readable media of claim 24, wherein:
    the first TTS voice is a parametric TTS voice;
    the second TTS voice is a parametric TTS voice; and
    the voice aging model comprises a manifold created by performing a regression analysis on parameters of the first TTS voice and the second TTS voice.

26. The one or more non-transitory computer-readable media of claim 24, the actions further comprising:
    creating a TTS voice using voice data; and
    modifying the TTS voice using the voice aging model.

27. The one or more non-transitory computer-readable media of claim 18, the actions further comprising:
    obtaining first voice data corresponding to the first user at a first age;
    creating a first TTS voice using the first voice data;
    obtaining second voice data corresponding to the first user at a second age, wherein the second age is different from the first age;
    creating a second TTS voice using the second voice data; and
    comparing the first TTS voice and the second TTS voice.

28. The one or more non-transitory computer-readable media of claim 18, wherein selecting the second prompt comprises selecting the second prompt using the first speech unit count information.

* * * * *